(12) United States Patent
Bochiechio et al.

(10) Patent No.: US 7,708,898 B2
(45) Date of Patent: May 4, 2010

(54) TANK SCREENING DEVICE FOR USE IN AUTOMATED CLEANING OF INVESTMENT CASTING SLURRY TANKS

(76) Inventors: Mario P. Bochiechio, 75 Hockman Blvd., Vernon, CT (US) 06066; Gary M. Tamiso, 36 Bodwell Rd., East Hartford, CT (US) 06108; David R. Scott, 141 Surrey Dr., Bristol, CT (US) 06010; Mark F. Bartholomew, 163 Pearl St., Enfield, CT (US) 06082

( * ) Notice: Subject to any disclaimer, the term of this patent is extended or adjusted under 35 U.S.C. 154(b) by 950 days.

(21) Appl. No.: 11/494,029

(22) Filed: Jul. 27, 2006

(65) Prior Publication Data

US 2008/0023413 A1 Jan. 31, 2008

(51) Int. Cl.
*B01D 37/00* (2006.01)

(52) U.S. Cl. .................... 210/767; 210/143; 210/138; 210/499

(58) Field of Classification Search ................. 210/600, 210/169, 470, 473, 474, 499, 748, 739; 422/255
See application file for complete search history.

(56) References Cited

U.S. PATENT DOCUMENTS

| 2,774,479 | A | 12/1956 | Cummings |
| 3,897,336 | A | 7/1975 | Bydalek et al. |
| 2004/0094487 | A1* | 5/2004 | Upchurch et al. ........... 210/791 |

* cited by examiner

*Primary Examiner*—Walter D Griffin
*Assistant Examiner*—Cameron J Allen

(57) ABSTRACT

A system for removing particles from a slurry tank includes a filtering device and a controller. The filtering device collects and removes particles deposited within the slurry tank and the controller controls the placement and movement of the filtering device with respect to the slurry tank.

11 Claims, 3 Drawing Sheets

TANK SCREENING DEVICE FOR USE IN AUTOMATED CLEANING OF INVESTMENT CASTING SLURRY TANKS

BACKGROUND OF THE INVENTION

The present invention relates generally to the field of investment casting. In particular, the invention relates to collecting and removing particles in investment casting slurry tanks.

In the investment casting industry, large slurry tanks with circulating ceramic slurry are used to coat injection molded wax patterns with ceramic. These slurry tanks are open to the environment and are typically used for weeks at a time. Wax patterns are assembled into a mold assembly. Typically, this assembly contains: gating, the wax pattern, and a pour cone. This assembly is then repeatedly dipped into the slurry tanks using a manual or automatic dipping process. After the ceramic slurry and stuccos have been adequately coated onto the wax pattern to create a ceramic shell, the wax is removed and metal is cast into the void in the ceramic shell left by the wax. After casting, the ceramic shell is then removed, leaving the cast metal part.

Because the slurry tanks are open to the environment, one problem that occurs as time progresses is that the water in the slurry tank begins to evaporate. Ceramic particles then agglomerate together and dry, forming a layer of dried ceramic agglomerates on the wall surfaces of the slurry tank and on the mixing blade (Z-bar) of the slurry tank. As moisture continues to evolve, dried ceramic builds up on the walls, the weight of the ceramic agglomerates can no longer be supported and the ceramic agglomerates fall into the ceramic slurry, creating debris within the slurry tank. Over time, large amounts of dried ceramic debris build up in the slurry tank, and as the slurry tank circulates the ceramic slurry, the dried debris continues to be stirred up in the slurry tank without being redispersed into the ceramic slurry.

Thus, when the molds are initially dipped into the ceramic slurry, the agglomerates also adhere to the surface of the wax pattern, forming defects. The defects are a result of the ceramic slurry not smoothly covering the surface of the mold due to the agglomerates. These agglomerates can form defects such as, but not limited to: excessive surface roughness, metal fining, positive metals, and inclusions. In order to smooth out the defects, additional processing after the mold has been cast is necessary during the finishing operations. It is therefore important to obtain a smooth and uniform surface on the initial dip into the ceramic slurry.

A current method of collecting and removing the ceramic debris from the slurry tanks is to manually scoop the ceramic debris from the ceramic slurry using a small hand-held screen. Due to the excessive agglomerate build up, the ceramic slurry in the slurry tanks have a lifetime of approximately a quarter of a year before the ceramic slurry must be discarded and replaced. Each time the ceramic slurry must be removed from the slurry tank, the slurry tanks must be cleaned, creating time and labor costs.

BRIEF SUMMARY OF THE INVENTION

A system for removing particles from a slurry tank includes a filtering device and a controller. The filtering device collects and removes particles deposited within the slurry tank, and the controller controls the placement and movement of the filtering device with respect to the slurry tank.

DETAILED DESCRIPTION

The particle removal system collects and removes ceramic debris from a slurry tank. To extend the life of the ceramic slurry, the ceramic debris is removed from the ceramic slurry by a filtering device controlled by a controller. The controller is connected to a dipping device that raises and lowers the filtering device with respect to the slurry tank. When the slurry tank does not need to be cleaned, the filtering device is positioned out of the slurry tank. When the slurry tank does need to be cleaned, the controller sends a signal to the dipping device to lower the filtering device in to the slurry tank for a period of time. The filtering device collects the debris floating around in the ceramic slurry and removes the debris when raised from the slurry tank. The controller is programmed to raise and lower the filtering device with respect to the slurry tank based on various parameters, including, but not limited to: the size of the slurry tank, the size of the filtering device, the speed that the slurry tank is circulating the ceramic slurry, and the frequency in which the slurry tank is used.

Figure 1A:
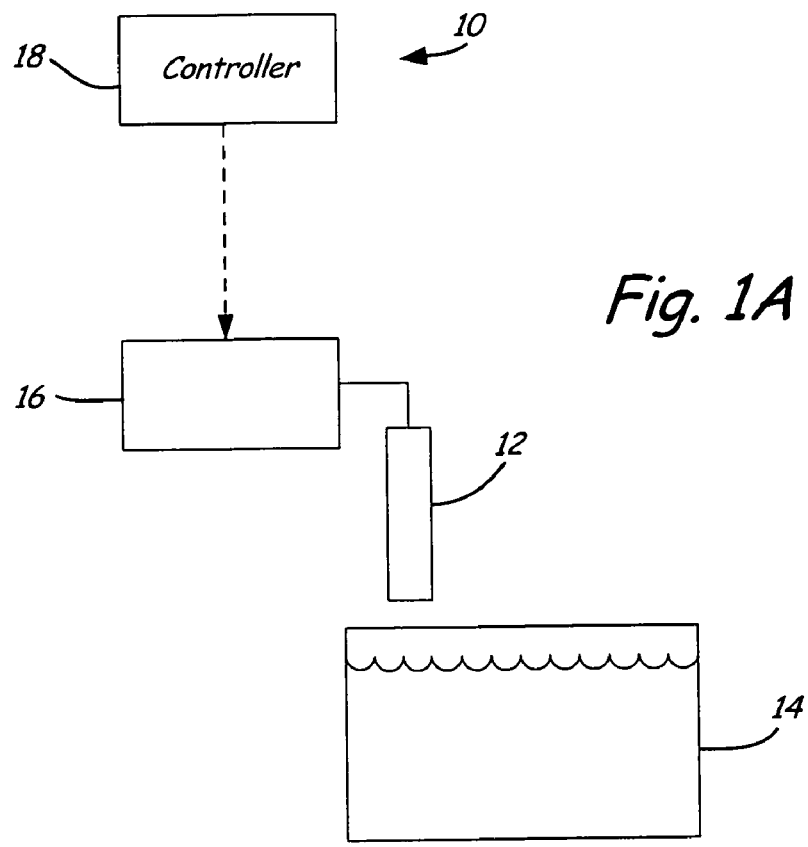
FIG. 1A is a schematic diagram of a system having a filtering device for removing particles from a tank.

FIG. 1A shows a schematic diagram of particle removal system 10 having filtering device 12 for collecting and removing particles from tank 14. System 10 generally includes filtering device 12, tank 14, dipping device 16, and controller 18. Filtering device 12 is operatively connected to controller 18 by dipping device 16. Controller 18 controls the frequency and duration of time that filtering device 12 is positioned within tank 14. System 10 reduces the amount of work required in the finishing operations of creating a mold, extends the life of ceramic slurries, and improves the quality of ceramic slurries. Although system 10 is discussed in relation to an investment casting slurry tank, system 10 may be used wherever it is desired to collect and remove particles from a tank.

Filtering device 12 is positioned above tank 14 and can readily transition between a raised position out of (i.e. above, beside, etc.) tank 14 and a lowered position within tank 14. Tank 14 contains ceramic slurry used in investment casting and continuously circulates the ceramic slurry. In one embodiment, tank 14 circulates the ceramic slurry at a rate of approximately 30 revolutions per minute. Dipping device 16 operatively connects filtering device 12 to controller 18 and controls movement of filtering device 12 with respect to tank 14. When filtering device 12 is not being used to collect and remove ceramic debris from tank 14, filtering device 12 may be positioned above tank 14, as shown in FIG. 1A.

Controller 18 may be programmed to control whether dipping device 16 positions filtering device 12 in the raised or lowered position. In operation, controller 18 sends a signal to dipping device 16 depending on the needs of tank 14. When tank 14 does not need to be cleaned, controller 18 sends a signal to dipping device 16 to maintain filtering device 12 in the raised position out of tank 14. When tank 14 needs to be cleaned, controller 18 sends a signal to dipping device 16 to lower filtering device 12 into tank 14. While FIG. 1A depicts filtering device 12 positioned directly above tank 14 when tank 14 does not need to be cleaned, filtering device 12 can be positioned anywhere relative to tank 14 other than submerged within the ceramic slurry in tank 14.

Figure 1B:
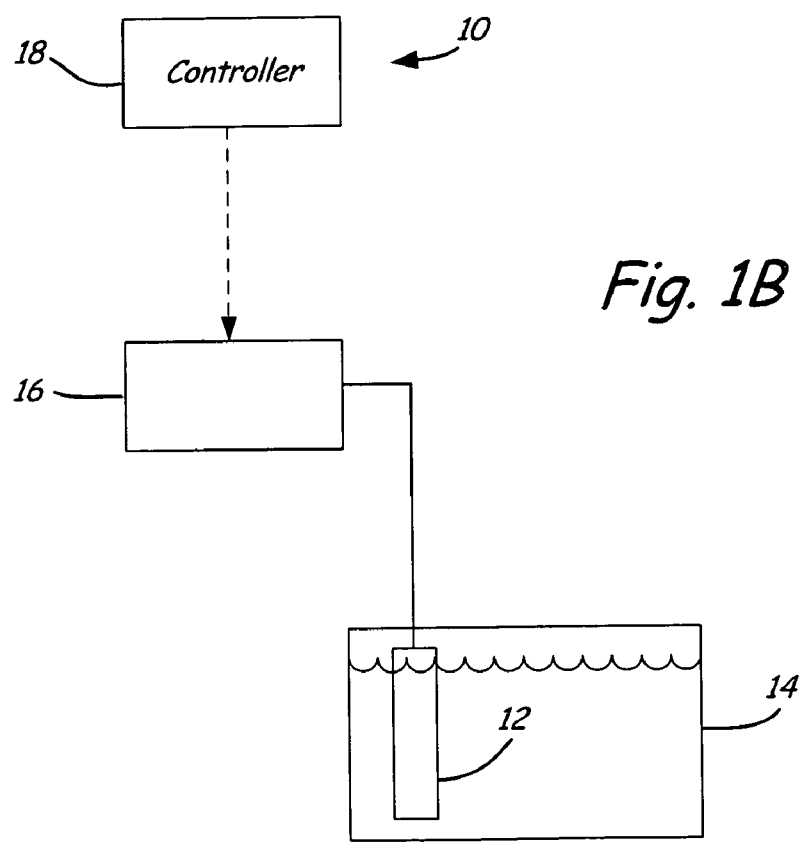
FIG. 1B is a schematic diagram of the system with the filtering device positioned within the tank.

FIG. 1B shows a schematic diagram of system 10 with filtering device 12 in the lowered position within tank 14. When tank 14 fills up with a predetermined amount of ceramic debris, filtering device 12 is used to collect and remove the ceramic debris from tank 14. Filtering device 12 is lowered into tank 14 when controller 18 sends a signal to dipping device 16 to lower filtering device 12. Filtering device 12 remains in tank 14 for a set period of time as programmed in controller 18. By removing the ceramic debris from the ceramic slurry in tank 14, the life of the ceramic slurry is extended. In one embodiment, the life of the ceramic slurry is increased by between approximately 3 weeks and approximately 6 weeks.

Controller 18 is programmed to control how often and for how long filtering device 12 is positioned within tank 14. Factors that determine the frequency and duration of positioning filtering device 12 in tank 14 include, but are not limited to: the size and volume of tank 14, the speed at which the ceramic slurry within tank 14 is circulating, the size of filtering device 12, and the frequency in which tank 14 is used. For example, filtering device 12 may be positioned within tank 14 for between approximately 2 minutes and approximately 3 minutes once a week if tank 14 is approximately 30 inches in diameter and approximately 30 inches deep and is used between approximately 2 times a week and approximately 4 times a week. In one embodiment, filtering device 12 is the gating assembly used to dip wax patterns into the ceramic slurry to form a ceramic mold. Thus, filtering device 12 can be used in conjunction with dipping device 16 and controller 18 to function as both a gating assembly to dip the wax pattern into tank 14 and as a filtering device to collect and remove debris from tank 14.

Figure 2:
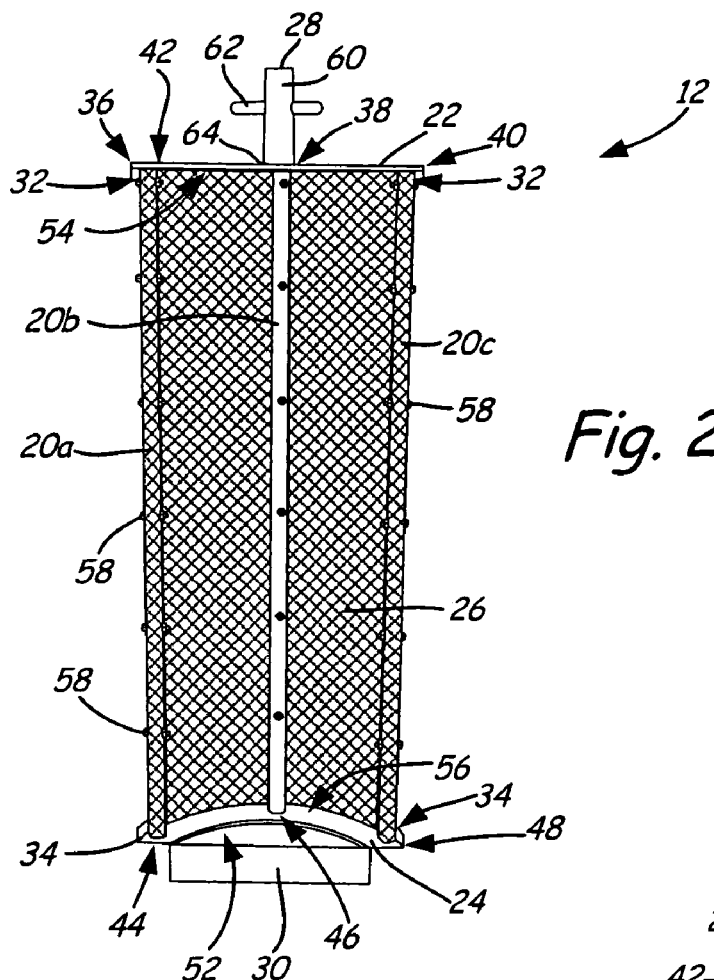
FIG. 2 is a front view of an exemplary embodiment of the filtering device.
Figure 3:
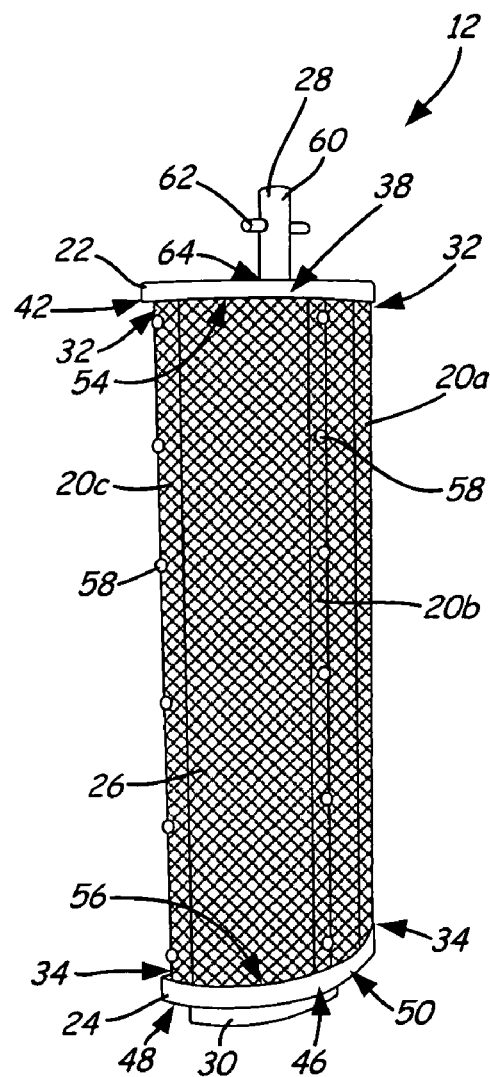
FIG. 3 is a back view of the filtering device.

FIGS. 2 and 3 show a front view and a back view, respectively, of an exemplary, non-limiting embodiment of filtering device 12 to be used with system 10, and will be discussed in conjunction with one another. Filtering device 12 generally includes first rod 20a, second rod 20b, third rod 20c, top panel 22, bottom panel 24, filter 26, connector 28, and collection tray 30. Rods 20a-20c may be positioned substantially parallel to one another and each of rods 20a-20c have a first end 32 and a second end 34. First ends 32 of rods 20a-20c are connected to top panel 22 and second ends 34 of rods 20a-20c are connected to bottom panel 24. Top panel 22 may have a semicircular shape with first end 36, mid-point 38, second end 40, and outer edge 42. Bottom panel 24 may have an acute shape with first end 44, mid-point 46, second end 48, outer edge 50, and inner edge 52. Outer edge 42 of top panel 22 and outer edge 40 of bottom panel 24 may have substantially the same curvature. Although top panel 22 is described as having a semicircular shape and bottom panel 24 is described as having an acute shape, top panel 22 and bottom panel 24 may take on other shapes without departing from the intended scope of the invention. For example, top panel 22 and bottom panel 24 may have a wedge shape.

Rods 20a-20c are connected between top panel 22 and bottom panel 24. First ends 32 of rods 20a-20c may be equally spaced along outer edge 42 of top panel 22 with first rod 20a connected to first end 36 of top panel 22, second rod 20b connected at mid-point 38 of top panel 22, and third rod 20c connected at second end 40 of top panel 22. Similarly, second ends 34 of rods 20a-20c may be equally spaced along outer edge 50 of bottom panel 24 with first rod 20a connected to first end 44 of bottom panel 24, second rod 20b connected at mid-point 46 of bottom panel 24, and third rod 20c connected at second end 48 of bottom panel 24. Rods 20a-20c can be connected to top panel 22 and bottom panel 24 by any means known in the art, including, but not limited to: welding, bolts, etc.

Filter 26 is positioned between top panel 22 and bottom panel 24 along outer edges 42 and 50 of top panel 22 and bottom panel 24, respectively. Filter 26 has a first end 54 and a second end 56 and extends from first ends 36 and 44 of top panel 22 and bottom panel 24, respectively, to second ends 40 and 48 of top panel 22 and bottom panel 24, respectively. First end 54 of filter 26 may be wrapped around first rod 20a and held in place by any suitable fastener (i.e. bolts 58). Second end 56 of filter 26 may be pulled taut around second rod 20b to third rod 20c, where second end 56 is wrapped around third rod 20c. Second end 56 of filter 26 may be connected to third rod 20c by any suitable fastener (i.e. bolts 58). Filter 26 may also be connected to second rod 20b by any suitable fasteners (i.e. bolts 58) where filter 26 abuts second rod 20b. Although filter 26 is described as being connected to rods 20a-20c by wrapping around first and second rods 20a and 20b and being bolted to rods 20a-20c, filter 26 may be connected to rods 20a-20c by any means known in the art. In one embodiment, filter 26 is a mesh screen that allows the ceramic slurry to pass through while capturing the ceramic debris.

In some embodiments, filtering device 12 may be connected to dipping device 16 (shown in FIGS. 1A and 1B) at top panel 22 of filtering device 12 by connector 28. Connector 28 includes shaft 60 and pin 62 and is attached to top panel 22 at a center point 64 of top panel 22. Shaft 60 extends perpendicularly from a plane of top panel 22 with pin 62 positioned normally through shaft 60. Filtering device 12 can then be connected to dipping device 14 by pin 62. Although FIG. 2 depicts connector 28 as a shaft 60 and pin 62 mechanism, connector 28 may connect filtering device 12 to dipping device 16 by any means known in the art, including, but not limited to, welding.

Figure 4:
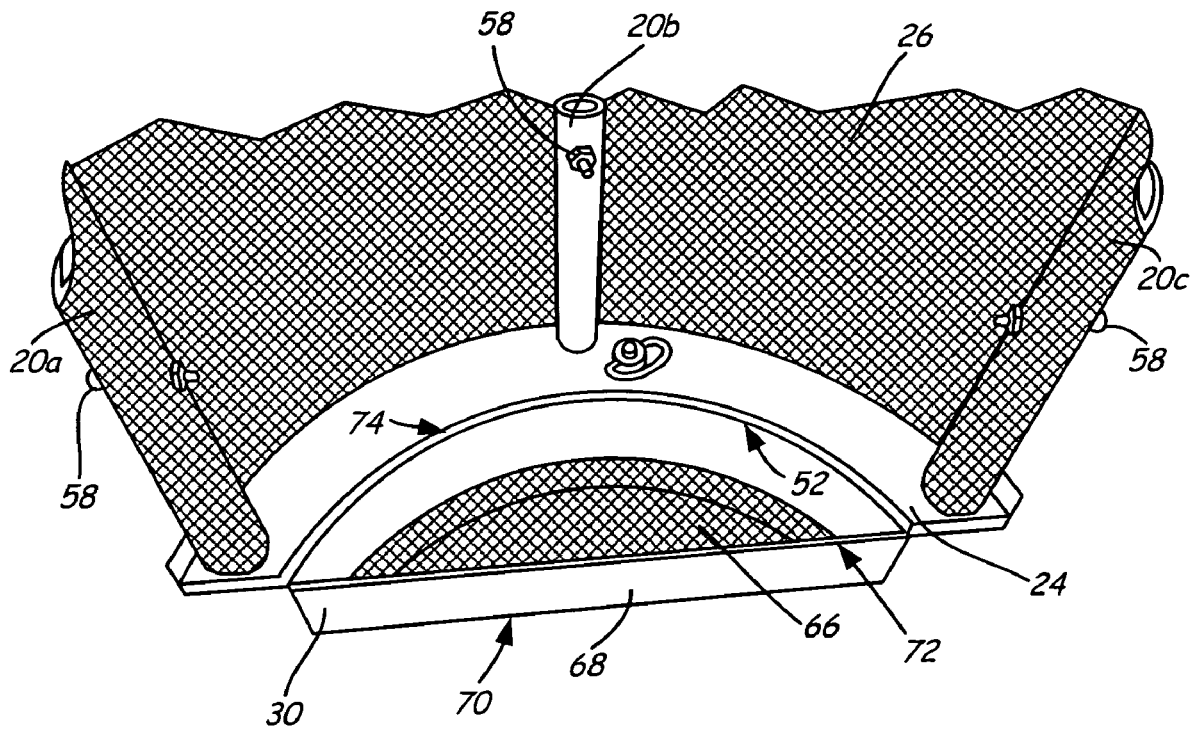
FIG. 4 is a top view of a collection tray of the filtering device.

FIG. 4 shows an enlarged top view of collection tray 30 of filtering device 12. As can be seen in the exemplary embodiment in FIG. 4, collection tray 30 has a semicircular shape and is connected to inner edge 52 of bottom panel 24. Collection tray 30 generally includes base sheet 66 and wall 68. Wall 68 has bottom edge 70 and upper edge 72. Base sheet 66 is connected to wall 68 along bottom edge 70 of wall 68. Wall 68 is sized such that an outer edge 74 of upper edge 72 has substantially the same curvature as inner edge 52 of bottom panel 24. Collection tray 30 is thus connected to inner edge 52 of bottom panel 24 at outer edge 74 of wall 68. In one embodiment, base sheet 66 is a mesh screen that allows the ceramic slurry to pass through collection tray 30, but not the ceramic debris. Collection tray 30 can be connected to bottom panel 24 by any means known in the art, including, but not limited to: welding or bolting.

Figure 5:
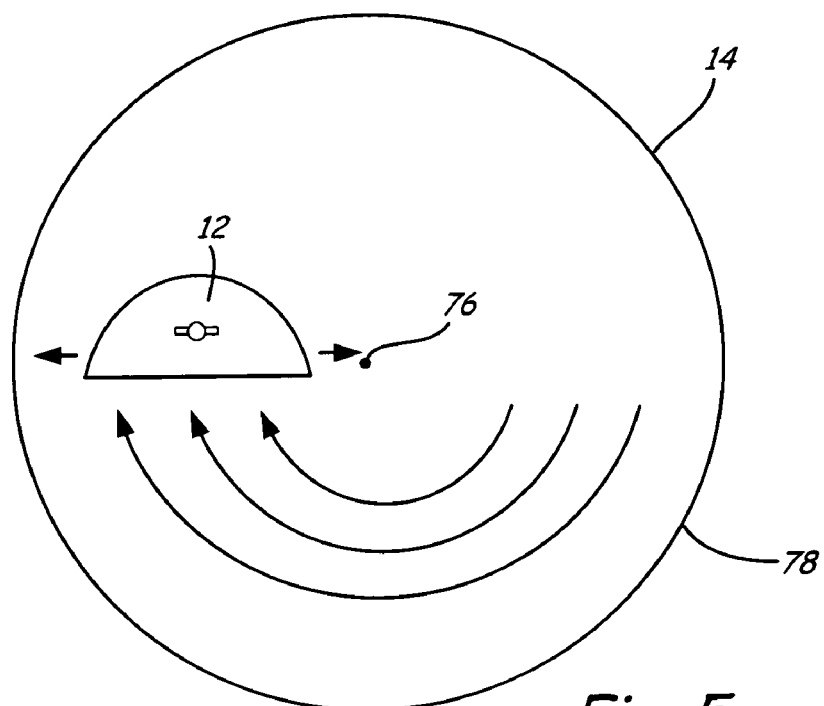
FIG. 5 is a top view of the filtering device positioned within the tank.

FIG. 5 shows filtering device 12 positioned within tank 14. In operation, when ceramic debris needs to be collected and removed from tank 14, filtering device 12 is lowered into tank 14, which is continuously circulating the ceramic slurry. Filtering device 12 is preferably lowered into tank 14 such that collection tray 30 does not come into contact with the bottom of tank 14 and inner edge 52 of bottom panel 24 (shown in FIGS. 2 and 3) and collection tray 30 of filtering device 12 are facing the flow of ceramic slurry in tank 14. Once filtering device 12 is submerged in tank 14, dipping device 16 (shown in FIGS. 1A and 1B) may move filtering device 12 from center point 76 of tank 14 to an outside wall 78 of tank 14, and then back again to center point 76 of tank 14. In order to collect the maximum amount of ceramic debris from tank 14, dipping device 16 may continuously move filtering device 12 back and forth between center point 76 and outside wall 78 of tank 14 while filtering device 12 is within tank 14. As the ceramic slurry rotates within tank 14 and filtering device 12 moves between center point 76 and outside wall 78 of tank, the ceramic debris floating in the ceramic slurry is collected in filter 26 of filtering device 12. When filtering device 12 is raised from tank 14, the ceramic debris caught in filter 26 drops into collection tray 30 and is collected for removal. After the ceramic debris is removed from collection tray 30, filtering device 12 is ready for subsequent use.

Filtering device 12 may be designed to have a height such that filter 26 stretches at least the height of tank 14 without actually coming into contact with the base of tank 14. When filtering tank 14 extends almost the entire height of tank 14, filtering device 12 collects a maximum amount of debris when submerged in tank 14. In one embodiment, filtering device is 35 inches tall and 12 inches wide, and tank is approximately 36 inches in diameter and approximately 36 inches in height. Although one embodiment of filtering device 12 is described in the discussion of FIGS. 2-5, filtering device 12 can take on any variety of shapes and sizes without departing from the intended scope of the invention as long as it can efficiently collect and removal debris from tank 14.

Although the present invention has been described with reference to preferred embodiments, workers skilled in the art will recognize that changes may be made in form and detail without departing from the spirit and scope of the invention.

The invention claimed is:

1. A process for removing particles from a tank, the process comprising:
    placing a filtering device to collect particles within a tank; the filtering device including a plurality of rods, each of the rods having a first end and a second end; a first panel having a semicircular shape and connected to the first end of each of the plurality of rods; a second panel an arcuate shape connected to the second end of each of the plurality of rods; a filtering screen connected between the first and second panel and around the plurality of rod; and
    using a controller to control the frequency and duration of time the filtering device is positioned within the tank.

2. The process of claim 1, wherein the plurality of rods of the filtering device are positioned along an outer edge of the first and second panels.

3. The process of claim 1, wherein the device further comprises a collection tray for collecting the particles collected by the filtering screen.

4. The process of claim 1, wherein the program is based in part on the size of the tank and the size of the filtering device.

5. A method for removing particles from a tank, the method comprising:
    providing a collection device including a plurality of rods, each of the rods having a first end and a second end; a first panel having a semicircular shape and connected to the first end of each of the plurality of rods; a second panel having an arcuate shape and connected to the second end of each of the plurality of rods; a filtering screen connected between the first and second panel and around the plurality of rod;
    programming an automated system to introduce a the collection device into the tank at predetermined times;
    positioning the collection device into the tank;
    collecting the particles from the tank in the collection device; and
    removing the collection device from the tank.

6. The method of claim 5, wherein the tank is about 30 inches in diameter and about 30 inches deep.

7. The method of claim 6, wherein the collection device is positioned within the tank for about 2 to about 3 minutes.

8. The method of claim 5, wherein collecting the particles from the tank comprises using a mesh screen.

9. The method of claim 5, wherein removing the particles from the tank comprises using a collection tray.

10. The method of claim 5, wherein the tank is a slurry tank used for investment casting.

11. The method of claim 5, wherein the automated system is programmed to position the collection device within the tank between about once every two times and once every four times the slurry tank is used.

* * * * *